April 24, 1934.    A. C. RICHARDSON    1,956,301
APPARATUS FOR TESTING METALLIC CONTAINERS
Filed Sept. 26, 1927
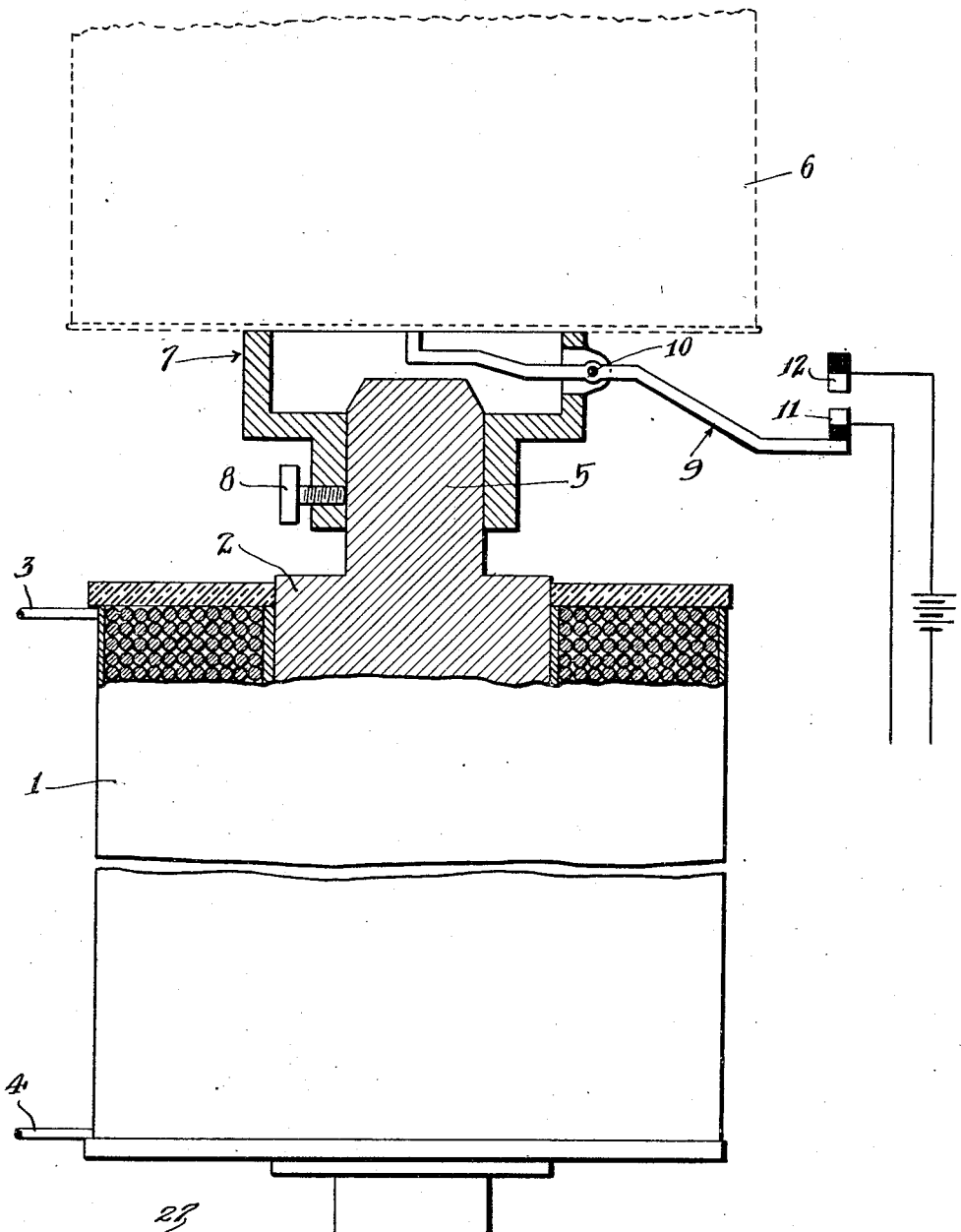
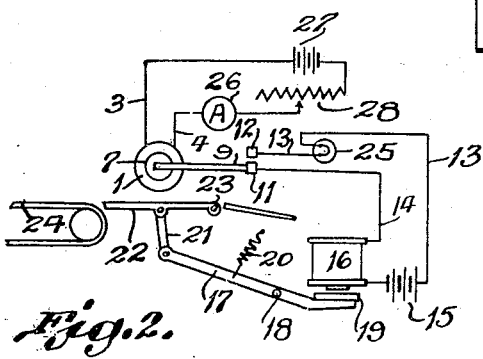
Inventor
Alan Campbell Richardson
By Lyon & Lyon
Attorneys Patented Apr. 24, 1934

1,956,301

UNITED STATES PATENT OFFICE 1,956,301

APPARATUS FOR TESTING METALLIC CONTAINERS

Alan Campbell Richardson, Menlo Park, Calif., assignor to California Packing Corporation, San Francisco, Calif., a corporation of New York Application September 26, 1927, Serial No. 222,177

6 Claims. (Cl. 73—51)

This invention is directed toward an apparatus for testing sealed metallic containers such as cans, particularly cans which have been filled with fruits, vegetables, meats, or other substances, whereby the condition of the contents may be determined without puncturing the can.

An object is to disclose an apparatus for determining the pressure conditions within a sealed metallic container.

As a particular example of my invention, I will describe its application to the testing of metallic containers such as cans, in which food products such as fruits have been packed.

In canning food products, various methods are employed, but generally the contents of the resulting container are at a pressure lower than atmospheric, usually called vacuum condition. The methods by which the packed food products are stored in partial vacuum are sometimes called vacuum packing methods and in detail embrace the heating of goods before filling the cans and sealing the cans while hot, or heating the filled cans with an open vent hole and then soldering the vent before cooling, or filling the cans cold, boiling the sealed can, puncturing the can to allow air to escape and sealing the aperture before cooling the can. In addition, machines are sometimes used which extract the air from the can while the contents are cold. Practically all of these operations are followed by a sterilization or sterilizing process so as to prevent decomposition or fermentation of the contents of the cans or other containers.

When sterilization has not been perfect or if certain impurities are present or if the containers are not air tight, the contents of these packages may ferment and spoil or react chemically with the metal of the container, causing it to be abnormally corroded. Both fermentation and chemical corrosion are usually accompanied by gas formation and in this way the pressure changes within the package or can, increase the pressure present over that found in freshly prepared containers. Often sufficient pressure is generated by fermentation to bulge or swell the containers.

My invention enables one to determine within a reasonable limit, the absolute pressure in the container or at least the relative pressure within said container, thereby making it possible to determine whether spoilage or abnormal corrosion has occurred in the container. This I am able to accomplish without puncturing or otherwise opening the container.

My invention permits the testing of metallic containers, preferably of magnetic material, by exposing a limited portion of the surface area of such container to a stress capable of flexing the metal, such stress being induced by a magnetic force. This stress, magnetic force or strength of induction may be predetermined experimentally so as to affect the area under contact and deflect the metallic surface in such area only when the absolute pressure within the hermetically sealed container exceeds a certain definite figure. Such magnetic force, inductance, pull or attraction may be expressed in terms of absolute pressure, dynes per square centimeter, inches of mercury or any other way after the apparatus has been calibrated. When deflection of the area under stress occurs then it is known that the contents of the container are at a higher absolute pressure than required or desired and if canned food containers are being tested, it is indicated that the contents are either partially fermented or otherwise not perfect. By the apparatus acting as described I am able to test canned goods and separate fermented or spoiled materials from perfect canned materials without examining the contents, leaving the contents of the same intact.

Preferably the stress, magnetic force or inductance is supplied by means of an electromagnet whose iron core is brought in close proximity to a section of the surface area of the metallic container. Best results are obtained when test work is carried out on the dished or flat ends or bases of cylindrical cans or on some such flat surface. The core of the electro-magnet is not allowed to come in contact with the can, but instead is spaced uniformly therefrom by suitable non-magnetic or even non-conductive means. The size of the area under stress is not critical although the larger areas require less stress to produce a deflection than smaller area, under identical interior pressures, due to the rigidity of the metal from which the cans are made. By limiting the flexed area to a relatively small one, I am able to minimize the variability due to the individual differences in shape and dimensions of the can surfaces, and to obtain a measurable degree of deflection with less change in the volume of the can. Since the gas space in food cans is ordinarily small, it will be seen that any considerable deflection of the ends may produce a very considerable change in the absolute pressure in the can contents.

Deflection of the surface under stress can be optically observed, but I prefer to introduce an electrical contacting means actuated by the flexure of the surface under stress, such flexure closing an electric circuit and lighting an indicator lamp, or by passing the current through a relay which actuates a suitable machine or trap for separating or discarding the flexed can. Such contact, relay or other mechanism may be readily designed in a number of modifications by those skilled in the art and made to operate in conjunction with my apparatus.

The fundamental parts of my testing device in one form thereof are illustrated in the appended drawing Fig. 1. Fig. 2 is a diagrammatic representation of electrical circuits and relay mechanism. The electro-magnet is composed of a winding 1 surrounding the iron or alloy core 2. Current is supplied to the electro-magnet as indicated by leads 3 and 4. One end of the core protrudes to form the stem 5 and this stem 5 is maintained out of direct contact with, but in close proximity to the can 6 by means of a cup or collar 7. This cup or collar 7, made from any non-conductive or non-magnetic material such as a phenol condensation product or brass, limits the area of the can surface subjected to flexure. This cup 7 may be suitably attached to the end of the iron core, for example, by means of a set screw 8. Between the stem 5 of the iron core 2 and the surface of the can under stress, there is placed a suitable device such as the lever 9 which normally is in contact with the surface of the area of the can 6 under stress. This lever is suitably pivoted as at 10 and carries an insulated contact point 11 in juxta-position to a similar contact point 12. These, or equivalent contact points, are connected as by lead lines 13 and 14 to a source of electrical energy indicated at 15 and a relay or an electromagnet such as is indicated at 16 which actuates a separating mechanism of any suitable construction. As shown in Fig. 2 such mechanism may comprise a bar 17 pivoted at 18 provided with an armature plate 19 positioned in operative relation to the core of the electromagnet 16. A spring 20 may normally maintain the armature plate 19 away from the core of the electromagnet 16. The bar 17 may be connected, as by means of a link 21, with a trap-door 22 pivoted at 23, said trap door being adapted to support containers being tested. The containers to be tested may be supplied thereto by means of a conveyor belt, generally indicated at 24.

The operation of this device is as follows:

The can to be tested, for example, can 6, is brought in contact with the positioning means or cup 7 and in contact with one end of the lever 9 as by means of the conveyor 24. Electro-magnetic force is then applied by means of the electro-magnet through the iron core 2 and stem 5 and if the absolute pressure within the can 6 is lower than the critical pressure on which the instrument is standardized, then there is no deflection of the area under stress. If, however, the absolute pressure within the can 6 is higher than normal, then the strength of the electro-magnet is sufficient to cause a deflection of the surface area under stress, thereby causing movement of the pivoted lever 9 and closing the electrical circuit by bringing contact points 11 and 12 together. The closure of this circuit actuates the relay and the separating mechanism. The closure of this circuit may also activate a lamp 25 so as to provide visual means for indicating flexure. When said circuit is closed the electromagnet 16 will be energized, thus causing the bar 17 to pivot at 18, such movement causing the trap-door 22 to open, thereby permitting the can being tested to drop through such trap.

It is understood that the strength of the electro-magnetic force supplied by means of the electro-magnet should be controlled so as to cause deflection in the metallic surface area of the cans being tested whenever the absolute pressure within the can exceeds a certain desired amount. The electro-magnetic force required to cause such flexure of the surface is not only dependent upon the pressure within the can, but is also dependent upon the distance between the core of the electro-magnet and the surface under stress and to a certain extent upon the area of the surface under stress as limited by the cup 7.

Furthermore, my apparatus may be used in determining the absolute pressure within metallic containers by subjecting a portion of the surface area of said containers to electro-magnetic induction and measuring the amount of said induction required to cause a flexure of the surface area under stress. It will be understood that the larger the force required to cause flexure, the lower the absolute pressure within the container. Inasmuch as the absolute pressure within a container containing food products increases upon partial decomposition or fermentation or in the presence of leaks in the container, this method can be used in determining whether the contents of the container are undecomposed or partly decomposed. The amount of electro-magnetic force required to cause flexure may be measured by means of an ammeter 26 positioned in line 4 and adapted to measure the current supplied to the electro-magnet 1 from a suitable source of current indicated at 27, and regulated by a variable resistance indicated at 28.

This apparatus is not only applicable to containers made entirely of metal, but may also be applied to containers having a portion thereof made of metal, for example, glass containers with metal caps.

While I have described a single testing unit, I comprehend the invention in all of its modifications. For example, a number of these units may be suitably mounted on a rotating table or conveyor and a constant stream of containers fed into such multiple testing device, automatic means being provided to position the cans, hold the cans in such position while under electro-magnetic stress and then automatically and continuously separate them. Or a container may be first subjected to a relatively weak electro-magnetic force, and if no deflection occurs the same container may be subjected to a stronger electro-magnetic force, thereby making a classification of containers into three grades.

I claim:

1. An apparatus for determining absolute pressure within a sealed magnetic metal container comprising, means for exerting an electro-magnetic stress upon the exterior surface of a sealed magnetic metal container, restricting means to limit the surface area of the container to which electro-magnetic stress is applied, and means carried by said restricting means and adapted to be actuated by movement of the surface of the container under stress.

2. An apparatus for testing and classifying goods in sealed magnetic metal containers, comprising means for exerting an electromagnetic stress upon a limited exterior surface area of a sealed magnetic metal container, signal means for indicating flexure of such limited area, said signal means being actuated by flexure of such area, and means actuated by flexure of such limited area for separating containers which show flexure from the others.

3. An apparatus for testing the condition of goods in sealed magnetic metal containers, comprising an electromagnet provided with a core, non-magnetic means adapted to space the core of said electromagnet from a container to be tested, said spacing means adapted to contact with and limit the surface area of the container under test, and means in contact with the limited surface area of the container adapted to be actuated by movement of such area toward the core of said electromagnet.

4. An apparatus for determining relatively the absolute pressures within sealed magnetic metal containers comprising an electromagnet, means for maintaining a sealed magnetic metal container in minimum spaced relation to the core of said electromagnet but in close proximity thereto, and means electrically connected to said electromagnet for measuring the amount of current passing through said electromagnet and required to cause said electromagnet to flex the surface of said metallic container while said container is in proximity to said electromagnet.

5. An apparatus for determining relatively the absolute pressures within sealed magnetic metal containers comprising an electromagnet, means for maintaining a sealed magnetic metal container in minimum spaced relation to the core of said electromagnet but in close proximity thereto, said means tending to limit the surface area of the container subjected to an inductive effect of the electromagnet, and means electrically connected to said electromagnet for measuring the amount of current passing through said electromagnet and required to cause said electromagnet to flex the surface of said metallic container while said container is in proximity to said electromagnet.

6. An apparatus for determining and indicating relative absolute pressure within a sealed magnetic metal container comprising: an electromagnet, means for maintaining a sealed magnetic metal container in minimum spaced relation to the core of said electromagnet and adapted to limit the external surface area of the container subject to an inductive effect of the electromagnet, a signal circuit, and pivoted means in contact with said limited surface capable of closing said signal circuit upon movement of such limited container surface toward the core of said electromagnet.

ALAN CAMPBELL RICHARDSON.